United States Patent [19]

Cross

[11] 4,170,183

[45] Oct. 9, 1979

[54] INCINERATING METHOD AND APPARATUS HAVING SELECTIVE, CONTROLLED MOVEMENT OF MATERIALS DURING COMBUSTION

[75] Inventor: John F. Cross, Denver, Colo.

[73] Assignee: Energy Generation, Inc., Denver, Colo.

[21] Appl. No.: 844,029

[22] Filed: Oct. 20, 1977

[51] Int. Cl.² .......................... F23G 5/00; F22B 1/22
[52] U.S. Cl. .................... 110/268; 110/257; 110/281; 110/282; 110/289; 110/291; 198/773
[58] Field of Search ............... 110/235, 228, 255, 257, 110/267, 268, 281, 282, 289–291, 327–329; 432/134, 239; 198/773, 736, 741; 214/23

[56] References Cited

U.S. PATENT DOCUMENTS

| 945,469 | 1/1910 | Mapel | 110/281 |
|---|---|---|---|
| 1,403,609 | 1/1922 | Leonard et al. | 110/282 |
| 3,212,465 | 10/1965 | Cates, Jr. et al. | 110/228 |
| 3,722,433 | 3/1973 | Kramer | 110/255 |
| 3,863,578 | 2/1975 | Kato et al. | 110/257 |
| 3,985,084 | 10/1976 | Delaplace | 110/257 |

Primary Examiner—Henry C. Yuen
Attorney, Agent, or Firm—Ancel W. Lewis, Jr.

[57] ABSTRACT

A method and apparatus for incinerating combustible materials wherein the movement of the material particles is controlled as they are moved over an arrangement of grate sections during combustion in relation to particle density so that less dense particles travel faster than more dense particles to provide for increased combustion efficiency. The grate sections are arranged in adjacent groups and in an alined, downstepped succession. Each grate section has a downwardly inclined, upper support surface and a reciprocating pusher block is moved an adjustable distance over an inlet end portion of the upper support surface of each pusher block to impart moving forces through the material in a pushing stroke that is substantially shorter than the full travel distance of the material along the associated grate section. An adjustable speed, reversible drive is coupled to the pusher blocks so as to provide related, opposite, reciprocating movement of adjacent pusher blocks and related in-phase movement of a succession of alined pusher blocks. An escapement coupling between each pusher block and an associated grate section provides for limited reciprocating movement of each grate section, and opposite movement of adjacent grate sections in each group of adjacent grate sections causes a shearing of the material to prevent clinker buildup.

28 Claims, 6 Drawing Figures

INCINERATING METHOD AND APPARATUS HAVING SELECTIVE, CONTROLLED MOVEMENT OF MATERIALS DURING COMBUSTION

FIELD OF THE INVENTION

This invention relates to a novel and improved method and apparatus for incinerating combustible materials and particularly waste materials having a range of different particle sizes and densities that is particularly adapted for the disposing of waste materials and also for recovery of usable energy from the waste materials.

BACKGROUND OF THE INVENTION

A variety of incinerating methods and apparatus have heretofore been devised for use in burning combustible materials including solid wastes. As the population increases in a given area there is a proportional increase in the amounts of solid wastes produced and at the same time there is an increase in the energy being consumed. In the past, a majority of the solid waste has been landfilled. This approach is not the best solution primarily because of the limits to convenient land available for land fill and because it fails to utilize the usable energy that can be derived from solid waste. With both the solid waste and energy problems becoming more acute, some attempts have been made to transform or convert solid waste into valuable fuel, sometimes referred to as "resource recovery." The use of waste or refuse-derived energy has the capability of offering a partial solution to the energy shortage and avoiding the necessity of importing oil to meet present energy needs in this country.

In recent years, one means of extracting energy from the incinerating of solid waste has utilized a preparation and isolation of only the combustible parts for the preparation of fuel to be used by generating stations, which is commonly referred to as "refuse-derived fuel." This approach has proven to be relatively expensive because of the equipment necessary to isolate the combustible particles from the inert particles.

Another approach for extracting energy for incinerating of solid waste involves the direct burning of all solid waste in an incinerator and a majority of the energy derived is transmitted by the resulting gas stream to a waste heat boiler to isolate the energy as steam.

In general, the present invention is directed to an incinerating method and apparatus wherein all of the solid waste collected is incinerated in a continuously moving flow of combustible and inert materials and the resulting gas stream is recovered as a source of energy.

An important consideration in providing an incinerator from which a valuable energy can be derived is a capability of efficiently burning coal along with the solid waste. Moreover, since solid waste increases in proportion to population growth, a plant must be readily adaptable for additional capacity in future years. Both of these considerations are taken into account by building a plant with a relatively large capacity and initially burning solid waste with coal and operating the system at 100% of capacity energy output. As the solid waste increases in the community the quantities of coal used in the burning process are decreased.

In the past a large majority of the grates used in solid waste incinerators have been adaptations or variations of coal burning stokers. The grates in these coal burning stokers have proved to be inefficient in burning solid waste and solid waste with coal. The primary reason for this combustion inefficiency is the wide range of size and density in the particles and the tendency of prior stoker grates to move all particles of different densities at substantially the same speed over a course of travel established by the grate.

Solid waste, unlike coal, is a conglomerate in geometry. An example would be tissue paper as compared to a catalog. Combustion, as a surface phenomenon, requires oxygen from the air, resulting in denser materials burning more slowly than the less dense, lighter materials. Tissue paper will burn in seconds, whereas a catalog may require an hour. The grates in coal-burning stokers generally tend to convey all particles at the same speed so they are too slow for fast-burning particles and too fast for slow burning particles. Accordingly, any rate of speed adjustment on previously known stoker-type grates is a compromise resulting in unburned combustible particles at the discharge of the grate, or inadequate system capacity.

Accordingly, it is a general object of this invention to provide a novel and improved method and apparatus for incinerating combustible materials.

Another object of the present invention is to provide a novel and improved incinerating method and apparatus of the type which involves the direct burning of solid waste collected in a continuously moving flow of both combustible and inert particles as well as coal with the solid waste.

Still another object of the present invention is to provide a method and apparatus for incinerating a continuously moving flow of combustible materials characterized by a controlled movement according to particle size and density wherein less dense particles travel faster than more dense particles, for a more complete burning of all particles during movement over a selected course of travel.

Yet another object of the present invention is to provide a novel method and apparatus for burning combustible materials capable of accommodating relatively large volumes of material and which is highly flexible to readily meet a wide range of solid waste requirements.

A further object of the present invention is to provide a method and apparatus for incinerating materials characterized by means for closely controlling and varying the movement of all particles, both inert and combustible, along a selected course of travel.

Yet a further object of the present invention is to provide a novel and improved grate characterized by a particular arrangement of groups of juxtaposed grate sections with a succession of alined grate sections and a pusher block associated with each grate section that pushes the material from an inlet end toward the outlet end along a slight downward incline in distance increments substantially less than the full travel distance of the material along the upper support surface of each grate section, forming a void during each push that is subsequently filled by a continuous feed of particles and imparting moving forces through the material causing selectivity of particle movement during combustion according to particle size and density so as to enhance combustion efficiency.

SUMMARY OF THE INVENTION

A method and apparatus for incinerating a continuously moving flow of combustible materials has an arrangement of groups of juxtaposed grate sections with a downwardly stepped succession of alined grate sections. Each grate section has a pusher block at the inlet end substantially shorter than the grate section that is reciprocally moved over a portion of the upper, downwardly inclined, support surface of the grate section to push the material from the inlet end toward the outlet end in a series of pushing strokes. Each pusher block moves back in a retracting stroke following each pushing stroke, during which a void on a portion of the supporting surface is refilled with a continuous feed of incoming combustible material. The forward travel of the pusher block is substantially less than the full travel distance of the material along the upper support surface of each grate section so that the pusher blocks impart moving forces through the material to bring about a selective movement during combustion in which less dense particles travel faster than more dense particles, providing a substantially uniform combustion for a continuously moving mixture of material particles having a range of different sizes and densities.

An adjustable speed, reversible drive provides related reciprocal movement for adjacent and the succession of alined pusher blocks. An escapement coupling between each pusher block and an associated grate section transmits power from each pusher block to an associated grate section for only a part of the stroke of each pusher block. Alined pusher blocks and grate sections have progressively less speed and adjacent pusher blocks and grate sections have opposite movement to provide a shearing action to prevent clinker buildup.

Other objects, advantages and capabilities of the present invention will become more apparent as the description proceeds, taken in conjunction with the accompanying drawings in which like parts have similar reference numerals and in which:

Figures 1, 2:
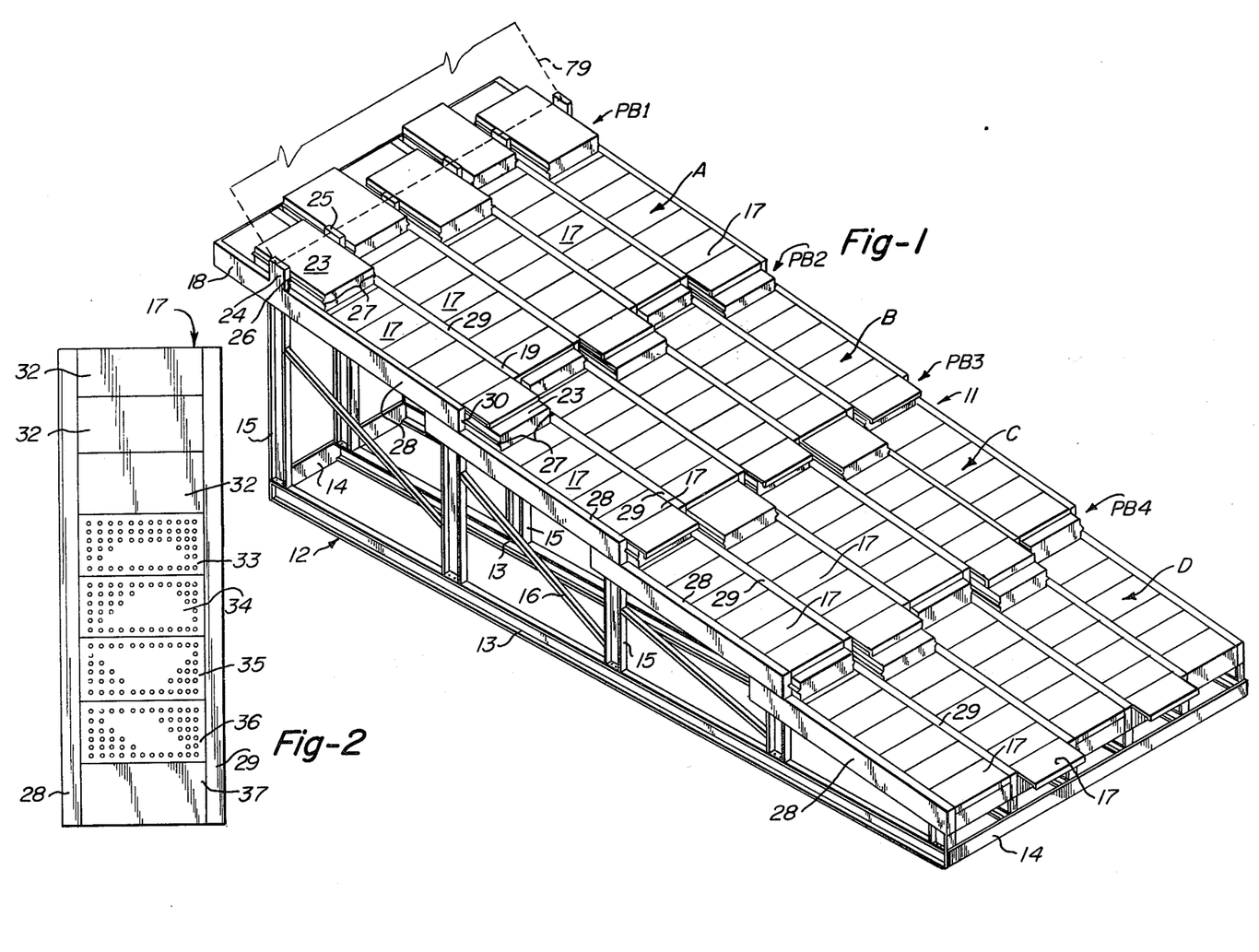
FIG. 1 is a perspective view of a four-step grate unit embodying features of the present invention.
FIG. 2 is a top plan view of one grate section shown in FIG. 1 with the overlying pusher block removed.

Referring now to FIG. 1 of the drawings, a grate unit 11 shown has a stationary supporting bed generally designated by numeral 12 including a plurality of laterally spaced, longitudinally extending, bottom beams 13, transverse bottom beams 14 connected to the ends of the longitudinally extending bottom beams 13 in a box configuration, and longitudinally spaced upright beams 15 and cross braces 16 with longitudinally extending top beams 18. The grate unit 11 has a plurality of grate sections 17 supported for reciprocating, lengthwise movement relative to the stationary supporting bed 12 and pusher block 23 supported for reciprocating, lengthwise movement relative to the stationary supporting bed 12 over an upper inlet end portion of each grate section 17 to move material along the associated below grate section, as described hereinafter.

A support arrangement for each pusher block 23 for a reciprocating forward and reverse movement relative to the support base 12 is provided by a series of support rollers 19 mounted at spaced intervals along the top beam 18 on which the pusher block will move in either direction when a suitable driving force is applied thereto. Each grate section 17 in turn is supported on a series of support rollers 21 mounted at spaced intervals along the top of the pusher block 23 which is covered by an above grate section on which the above grate section will move when a suitable driving force is applied thereto. The support rollers 19 and 21 shown are preferably provided as sets disposed under and laterally inset from the opposite side edges of the pusher blocks and grate sections for a greater load capacity.

The grate sections 17 shown, beginning at the feed or inlet end, are arranged as a first group of five adjacent or juxtaposed grate sections collectively designated A with a succession of three additional, alined, downstepped grate sections for each grate section in the first group to provide three additional groups of juxtaposed grate sections collectively designated B, C, and D, respectively, arranged end-to-end over which the material is advanced or continuously moved during combustion. The pusher blocks, beginning at the feed end and proceeding toward the discharge end, are arranged as a first group PB1, second group PB2, third group PB3, and fourth group PB4. The pusher blocks and grate sections are downwardly sloping at a slight angle to the horizontal on the order of five to twelve degrees, preferably about six degrees.

At each step, as best seen in FIG. 2, there is a pusher block 23 with a grate section above and a grate section below. The grate section above has an outlet end above and overlapping the inlet end of the grate section below so that the combustible material from the grate section above is discharged onto the pusher block and then onto the inlet end of the grate section below with the last grate section in the line of grate sections discharging a burnt residue or ash.

Each of the grate sections 17 is of a generally hollow, box-like construction made of a heat-resistance material with the surfaces exposed to heat preferably being of cast iron. Each grate section has a top wall with a flat or planar, rectangular, upper support surface that is downwardly sloping on which the material moves during combustion, a front pusher wall, and a pair of side walls with internal cross-beams shown for added strength and support, leaving the bottom open for the passage of air up through the bottom and out the top wall.

The top wall of grate section 17 is made of a plurality of rectangular segments. The detail of each segment is illustrated in FIG. 2 and, as shown, comprises eight segments, the first three of which are designated 32, followed by segments 33, 34, 35, 36 and 37, with segments 32 being at the inlet end and the portion over which the pusher block moves and segment 37 at the outlet end and the segments 33, 34, 35 and 36 between segments 32 and 37. Segments 32 and 37 are imperforate while segments 33-36 have a plurality of apertures or perforations to pass air therethrough to support the combustion of the material.

Each of the pusher blocks 23 is also of a generally hollow, box-like shape with a top wall providing a flat or planar rectangular upper surface that is disposed to slope down at a slight angle and over which the combustible material moves during combustion, a curved front wall, and a pair of side walls with internal cross-beams for strength, again leaving the bottom open. The width of the pusher block is substantially coextensive with that of the associated grate section and the length of the pusher block is considerably less than the length of the associated below grate section, as described more fully hereinafter. Each pusher block 23 is made of a heat-resistant material and the surfaces thereof exposed to heat are preferably made of cast iron.

The pusher blocks 23 for the grate sections of group A shown have a pair of opposed side members 24 and 25, each with a side groove 26 into which a tongue portion 27 on the side of the pusher block slides for guided reciprocating movement. The side members 24 and 25 also serve to support the inclined feed member 79 above the pusher blocks 23. The pusher blocks in groups PB2, PB3 and PB4 have a pair of opposed side members designated by numerals 28 and 29 which extend the full length of the above or preceding grate section. Each of the side members 28 and 29 has a groove 30 into which the tongue portion 27 of the pusher block 23 slides.

Figures 4, 5:
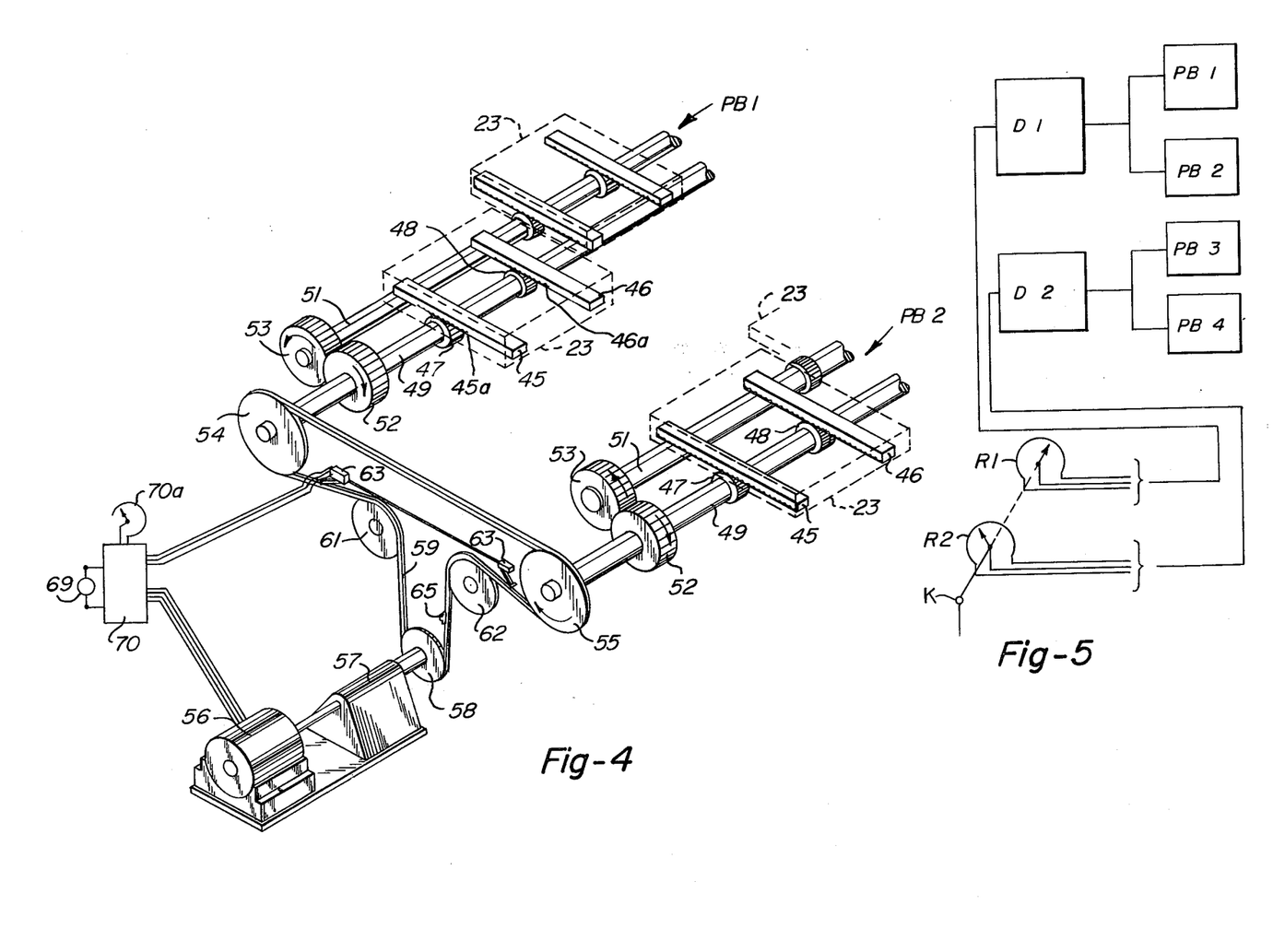
FIG. 4 is a perspective view of an adjustable speed, reversible drive for the moving of two successive groups of pusher blocks shown in FIG. 1.
FIG. 5 is a schematic diagram of a drive for four successive groups of pusher blocks.

Referring now to FIGS. 4 and 5, a suitable reversible drive shown for driving each of the pusher blocks 23 in a reciprocating movement includes two laterally spaced racks 45 and 46 each with downfacing gear teeth 45a and 46a, respectively, which are shown secured to the underside of each pusher block 23. Rack 45 is driven by pinion gear 47 meshing with the teeth on the rack 45 and in a like manner rack 46 is driven by pinion gear 48. The gears 47 and 48 are mounted for rotation at spaced locations along a drive shaft 49. A similar arrangement is provided for the adjacent pusher block 23 which includes a drive shaft 51 parallel to shaft 49 with similar pinion gears and racks for moving the adjacent pusher block 23.

A pair of counter-rotating, meshing spur gears 52 and 53 are mounted on drive shafts 49 and 51, respectively. Shaft 49 carries a common drive sprocket 54 which when rotated causes shafts 49 and 51 to rotate and, because of gears 52 and 53, rotate in opposite directions. This rack and gear arrangement with counter-rotating meshing spur gears permits the rotation of a single drive shaft 49 at a selected speed in one direction to move adjacent pusher blocks in each group in opposite directions and a reversal of the directions of the adjacent pusher blocks when that single drive shaft is rotated in the opposite direction. A single, adjustable speed, drive motor may be used to drive the shaft 49 at a selected speed with a different drive motor for each group of pusher blocks.

In FIG. 4 there is shown a similar arrangement of racks, gears and shafts of corresponding numbers for the succeeding second group of pusher blocks, designated PB2, which is driven through a drive sprocket 55. The two other succeeding groups of pusher blocks, designated PB3 and PB4, are moved by a similar drive arrangement.

For the purpose of illustrating a single drive motor for two successive groups of pusher blocks and coordinated speed therebetween, there is shown in FIG. 4 a single, reversible, electric DC motor 56 driving a gear reducer 57 which has an output sprocket 58. A chain 59 is trained over sprocket 58 and sprockets 54 and 55 above described, with idler sprockets 61 and 62 taking the slack out of the chain 59. Rotation of sprocket 58 rotates sprockets 54 and 55 in the same direction and meshing gears 52 and 53 are rotated to rotate shafts 51 and 49 in opposite directions to provide related or coordinated movement between two succeeding groups of pusher blocks from a single drive motor 56.

The electric power to the DC motor 56 from an AC source 69 is converted to DC by a controller 70 having a rheostat 70a whereby a change in the setting of the rheostat 70a effects a change in the speed of the drive motor 56. A change of the speed of the motor 56 changes the speed or rate of movement of each of the pusher blocks. By using a different gear ratio, the next succeeding group of pusher blocks PB2 can be made to run at a slower speed using the same drive motor. Separate drive motors for each group of pusher blocks may achieve successively slower speeds.

A full drive system for the four successive groups of pusher blocks PB1, PB2, PB3 and PB4 is schematically depicted in FIG. 5. The first drive, designated by block D1, drives two groups of pusher blocks PB1 and PB2 and a second drive D2 drives the other two groups of pusher blocks designated PB3 and PB4. Since drives D1 and D2 include an adjustable speed, reversible, DC motor type as described with reference to FIG. 4, the speed of each successive group of pusher blocks and associated grate sections can be carefully controlled, related, and adjusted using conventional DC motor speed controls. A further control feature for the two drives D1 and D2 is illustrated in FIG. 5 wherein a rheostat R1 for drive D1 and a rheostat R2 for drive D2 are connected to a common control knob K whereby, upon the adjustment of the knob K, the speeds of both drives D1 and D2 are adjusted in a related manner.

By establishing the speed of the successive pusher blocks at progressively lesser speeds, the depth of the material bed can be closely regulated relative to the type of material such as coal, garbage, and the like.

Another control feature of the above described grate unit is the travel distance of each pusher block. This travel distance is best established by a pair of spaced-apart limit switches designated by numeral 63 located at a selected distance along chain 59 that are electrically connected to the controller 70 for the motor by suitable electric lines. The spaced apart limit switches 63 are engaged by a limit switch dog 65 movable on chain 59. When the dog 65 engages one of the limit switches 63, the motor 56 stops and reverses. When the pusher block has traveled a selected distance in the other direction, the other limit switch is engaged and the motor stops and reverses. By moving the limit switch 63 closer together or farther apart, the travel of the pusher block is controlled.

Figure 3:
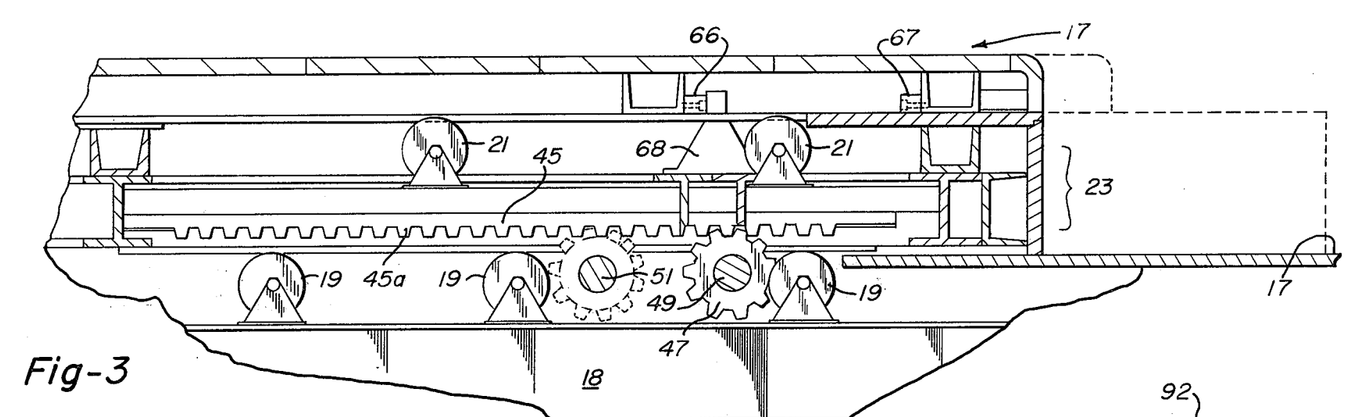
FIG. 3 is a longitudinal sectional view through one pusher block disposed in a retracted position and the associated grate sections disposed above and below that pusher block.

An escapement coupling arrangement is provided that transmits the reciprocating motion of each pusher block 23 to a grate section 17 above the pusher block. This escapement coupling includes a rear block 66 and a front block 67 located a selected distance apart along the inside of the above grate section, together with a coupler block 68 affixed to and upstanding from the underlying pusher block, so that when the pusher block is in its rear position it will travel a selected distance before the coupler block 68 engages the forward block 67, at which time the pusher block 23 and above grate section 17 move conjointly in the forward direction. When the motion of the pusher block 23 is reversed, as above described, the pusher block 23 will travel independently of the upper grate section 17 for the escapement distance between blocks 66 and 67 and the rear block 66 finally is engaged by the coupler block 68, and then the upper grate section 17 will travel back with the pusher block 23 to the rear starting position.

The escapement distance between blocks 66 and 67 can be varied by providing a different size of interchangeable block using a bolt fastening as shown or by having a support arrangement on the grate section whereby the blocks may be moved and fastened at selected positions closer together using bolt fasteners or the like.

In summary, both the pusher blocks 23 and grate sections 17 are supported for independent reciprocal movement relative to the support structure 12 and the drive arrangement for these pusher blocks, and in turn the grate sections, is adjustable-speed and reversible. The distance each pusher block travels, and in turn the associated grate section travels, in adjustable and each succeeding pusher block may be adjusted to move at a slower speed or shorter stroke. Finally, the adjacent pusher blocks, and in turn the adjacent grate sections, move in opposite directions and this out-of-phase or opposite direction relationship is adjustable.

In a preferred embodiment the length of the pusher block is about two feet and the length of each grate section is about seven feet. The ratio of the length of the pusher block to the length of the grate section is between about 1:2 and 1:10. The stroke for this two-foot pusher block is about two feet and the ratio of the stroke of the pusher block to the length of the grate section is between about 1:2 and 1:10.

Figure 6:
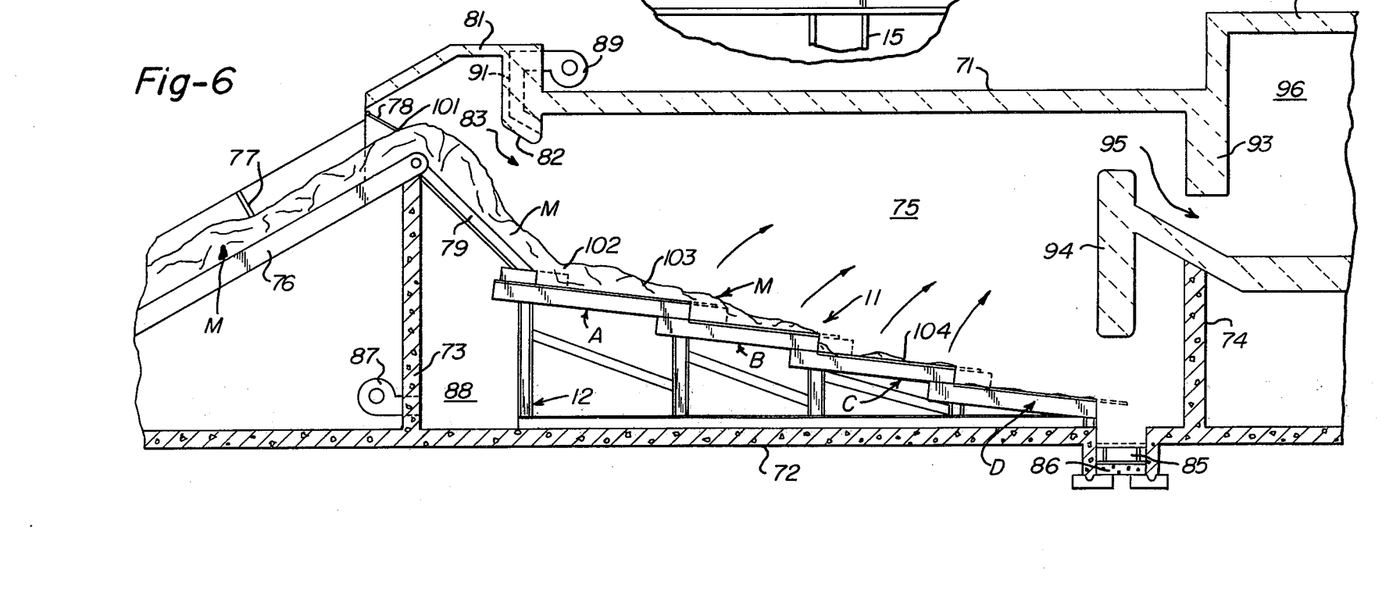
FIG. 6 is a vertical sectional view through incinerator apparatus including the grate unit shown in FIGS. 1-5.

An incinerator from which heat energy may be withdrawn and in which the above described grate unit 11 may be operated is shown in FIG. 6. The incinerator shown includes a top wall 71, a bottom wall of floor 72, an inlet end wall 73, and an outlet end wall 74 defining a primary combustion chamber 75 in which the grate unit 11 is contained.

The combustible material M is elevated by a controlled, variable speed, feed conveyor 76, is leveled by a leveling plate 77, and is moved against an air seal plate 78. The combustible material then falls from the feed conveyor 76 onto a downwardly inclined feed member 79. A charging throat 83 is formed between an upstepped top wall section 81 with a drop arch 82 and a down-sloping feed member 79 that receives material from the feed conveyor 76. The feed of material from the downsloping feed member 79 is discharged onto the void formed by the forward stroke of the first group of pusher blocks PB1.

In the operation of the grate unit 11 the combustible materials, which are typically solid waste materials and/or coal or a mixture of both, and are designated M, are discharged onto the inclined upper surfaces of the first group of pusher blocks PB1 at the head or upper end of the grate unit. Each of the first group of pusher blocks moves forward to move the material on the associated below grate section forward, and as each pusher block retracts a void is formed between the pusher block and the previously advanced materials. As this void is formed, materials on the inclined feed member 79 are discharged by gravity to fill the void. The next forward stroke of the pusher block reacts on the material on the allociated lower grate section, replacing the void, and further advances the previous materials disposed thereon. After successive reversals or reciprocations of the pusher blocks, the materials are advanced to the succeeding alined pusher block and grate section step and are finally discharged off the lowest grate section in group D as burnt residue.

The rate of movement of the pusher blocks and in turn the grate sections is adjustable by varying the speed of the drive motor 56 by the setting of rheostat 70a. The travel distance of the pusher blocks in each group is adjustable by the distance of limit switches 63 along the chain 59. The relative movement between each pusher block and associated above grate section is readily changed to a desired amount by a change of escapement by changing the distance between the adjustable blocks 66 and 67. The relationship and extent of opposite movement of adjacent pusher blocks is adjustable by changing the gearing on the shafts. The succeeding groups of grate sections are preferably driven at progressively slower speeds to accommodate the changing bulk or mass of material as it is reduced in the combustion process.

This versatility permits a greater accommodation for the relative percentages of coal and solid waste and permits adjusting to a selected motion/time relation to achieve maximum zonal requirements for the drying, exothermic reaction, endothermic reaction, and dying out described hereinafter. In the operation, once the various adjustments have been made for a particular ratio of waste fuel, the traverse of the material along the grate unit is dependent primarily on the rate of material feed. Once the grate unit is shut down, there is ash disposed on the upper surfaces at all times which serves to insulate the metallic surfaces against detrimental radiant heat from the refractory arch and walls.

There are essentially four treatment zones in the incinerating apparatus shown in FIG. 6. In the first zone the material is dried and dewatered. This is carried on while the material is on the feeding member 79 approximately between points designated by numerals 101 and 102. The next zone is the heat absorbing or endothermic zone in which most of the heat is absorbed, and this is carried out primarily between points designated by numerals 102 and 103. The third zone is the energy-out or exothermic zone, which is primarily carried out between points designated by numerals 103 and 104, and the heat evolved passes up into the primary chamber in a direction substantially as is indicated by arrows. The fourth zone is the dying-out zone comprised primarily of ashes and non-combustible particles and is approximately in the area between points designated by numeral 104 and the discharge end of the grate unit. By adjusting the relative speed of each group of pusher blocks and in turn each group of grate sections, the treatment zones can be varied somewhat along the grate unit according to specific requirements.

The inert or non-combustible particles and ashes are discharged from the end of the grate sections of group D to a residue grag plate type conveyor 85 contained in a trough 86 in floor 72 below the discharge end of the grate section D. The residue conveyor is submerged in water which quenches the hot ash and minimizes airborne ash.

An under air blower 87 is mounted in the inlet end wall 73 to introduce air to the under air plenum 88 under the grate section. An over air blower 89 is mounted on the upper section 81 at the inlet end with a passage 91 in the drop arch 82 that pumps air into the primary chamber 75.

The gases which result from the combustion of organic material within the material are forced upwardly to mix with the airstream of the primary combustion chamber 75. Due to the action of the combustion and the air supplied through the perforated grates, some solid particles are entrained in the airstream, which are herein referred to as "fly ash."

Another upstepped top wall section 92 at the outlet end has a drop arch 93 that extends down from the top wall section 92 which, together with a bull nose 94 projecting from wall 74, forms an outlet throat 95 that communicates with a secondary chamber 96.

The primary combustion chamber 75 and secondary combustion chamber 96 are maintained in a negative draft condition with respect to atmospheric pressure outside the system by induced draft fans at the discharge end of the system. Accordingly, each chamber in the direction from the induced draft fans to the front of the system becomes less negative due to the accumulation of static pressure drops between the chambers. Therefore, the control of the direction of the gases is from the charging throat through the primary, secondary, and boiler chambers to the induced draft fans. The area below the grates is maintained at a pressure above atmospheric to assure the flow of combustion air through the perforated grates. The heat energy produced by this procedure is a heated airstream that may readily be utilized by a steam boiler to provide a substantially useful energy output.

Although the present invention has been described with a certain degree of particularity, it is understood that the present disclosure has been made by way of example and that changes in details of structure may be made without departing from the spirit thereof.

What is claimed is:

1. In apparatus for incinerating a combustible material, the combination comprising:
    moving grate means including a plurality of juxtaposed reciprocating grate sections each moving alternately forward and backward in relation to the direction of material advancement on said grate sections, each grate section having an upper surface for supporting a combustible material during combustion, said upper surface being inclined downwardly in the direction of material advancement from an inlet end to an outlet end for each of said grate sections;
    reciprocating pushing means including a pushing member at the inlet end of each of said grate sections for successively moving forwardly over the downwardly inclined upper surface of each grate section a distance substantially less than the full length of each upper surface of each grate section between the inlet end and the outlet end to advance the material along each grate section by forces imparted through the material on each grate section in a forward stroke and moving backward in a back stroke after each forward stroke leaving a void in the material on each grate section; and
    means for filling said void after each back stroke with incoming material that is advanced by the next forward stroke of each pushing member which in turn advances the previously advanced material further along the upper surface of the associated grate section by forces imparted through the material on each grate section to cause a selective particle movement whereby less dense particles travel faster than more dense particles during the combustion of said particles.

2. In apparatus as set forth in claim 1 wherein there is a succession of a selected number of grate sections in alinement with each of said plurality of juxtaposed grate sections to provide a selected number of groups of juxtaposed grate sections.

3. In apparatus as set forth in claim 2 wherein each succeeding alined grate section moves at a slower speed.

4. In apparatus as set forth in claim 2 wherein the lower end portion of each alined grate section overlaps an upper end portion of the next grate section.

5. In apparatus as set forth in claim 1 wherein said upper support surfaces of said grate sections are substantially coplanar.

6. In apparatus as set forth in claim 1 wherein said grate sections have apertures extending through their upper support surfaces to admit air into the material during combustion.

7. In apparatus as set forth in claim 1 wherein adjacent of said juxtaposed grate sections move in opposite directions to cause additional shearing of the combustible materials during combustion.

8. In apparatus as set forth in claim 1 including means for varying the speed of said reciprocating means for controlling the speed of movement of the material over said upper support surfaces during combustion.

9. In apparatus as set forth in claim 8 wherein said means for varying includes an adjustable speed, reversible drive motor.

10. In apparatus for incinerating a combustible material, the combination comprising:
    moving grate means including a plurality of juxtaposed reciprocating grate sections each moving alternately forward and backward in relation to the direction of material advancement on said grate sections, each grate section having a downwardly inclined, upper support surface over which a combustible material moves during combustion;
    reciprocating means successively pushing an incoming combustible material along said upper support surface of each grate section in distance increments substantially less than the full travel distance of the material along the upper support surface of each grate section for imparting moving forces through the material on the upper support surface of each grate section to cause a selective particle movement whereby less dense particles travel faster than more dense particles during the combustion of said particles; and
    a succession of a selected number of grate sections in alinement with each of said plurality of juxtaposed grate sections to provide a selected number of groups of juxtaposed grate sections,
    said reciprocating means including a pusher block at the inlet end of each grate section having a width substantially corresponding to the width of the associated grate section, each pusher block reciprocating back and forth over a portion of the upper surface of the associated grate section.

11. In apparatus as set forth in claim 10 wherein the movement of two succeeding groups of grate sections is coordinated to move in the same direction at the same time in a forward stroke and in the same direction at the same time in a return stroke.

12. In apparatus as set forth in claim 10 wherein the motion of said pushing members is transmitted to move said grate sections.

13. In apparatus as set forth in claim 10 wherein said pusher block reciprocates back and forth over an inlet end portion of the upper surface of an associated grate section.

14. In apparatus as set forth in claim 13 wherein said pusher blocks and said grate sections are each independently supported for reciprocating movement on and relative to a support base.

15. In apparatus as set forth in claim 13 wherein the ratio of the length of the pusher block to the length of the associated grate section is between about 1:2 and 1:10.

16. In apparatus as set forth in claim 13 wherein the ratio of the stroke of the pusher block to the length of the associated grate section is between about 1:2 and 1:10.

17. In apparatus as set forth in claim 13 wherein each of said pusher blocks is mechanically coupled to an associated grate section by an escapement coupling means whereby a portion of the movement of the pusher block in both a forward and a return stroke is transmitted to the associated grate section.

18. In apparatus as set forth in claim 13 including an inclined feed member overlying a portion of the pusher blocks for the grate sections for delivering a continuous feed of the material onto the pusher blocks, the pusher blocks reciprocating back and forth under said inclined feed member.

19. In apparatus as set forth in claim 13 wherein said reciprocating means includes a pair of oppositely rotating shafts for driving adjacent pusher blocks in opposite directions to the extent of 180° out of phase through a rack-type gear train including at least one rack gear movable with each pusher block meshing with a gear carried by one of said rotating shafts.

20. In apparatus for incinerating combustible materials, the combination comprising:
   moving grate means including a plurality of adjacent reciprocating grate sections arranged in a succession of a selected number of alined, downstepped grate sections, each of said grate sections moving alternately forward and backward in relation to the direction of material advancement on said grate sections, each grate section having an upper surface for supporting a combustible material during combustion, said upper surface being inclined downwardly in the direction of material advancement from an inlet end to an outlet end for each of said grate sections;
   a pusher block supported for reciprocating movement on an inlet end portion of each of said inclined grate sections, the pusher block and associated grate section of each succession of alined grate sections and pusher blocks being arranged with an outlet end portion of one grate section overlapping the next succeeding pusher block and an inlet end portion of the associated grate section;
   drive means for successively moving each of said pusher blocks over a portion of the upper support surface at the inlet end of an associated grate section in a forward stroke toward the outlet end a distance substantially less than the full length of each upper surface of each grate section between the inlet end and the outlet end to advance the material along each grate section by forces imparted through the material on each grate section and moving backward in a back stroke after each forward stroke leaving a void in the material on each grate section; and
   means for filling said void after each back stroke with incoming material that is advanced by the next forward stroke of each pushing member which in turn advances the previously advanced material further along the upper surface of the associated grate section by forces imparted through the material on each grate section to cause a selectivity of particle movement whereby less dense particles travel faster than more dense particles between the inlet end and outlet end of each grate section during the combustion of said particles.

21. In apparatus for incinerating combustible materials and generating energy in the form of heat, the combination comprising:
   a support base;
   a plurality of juxtaposed grate sections arranged in a succession of a selected number of alined, downstepped grate sections supported for reciprocating movement on and relative to said support base, each of said grate sections having a downwardly inclined upper support surface on which a combustible material moves from an inlet end to an outlet end during combustion;
   a pusher block supported for reciprocating movement on said support base and on an inlet end portion of each of said inclined grate sections, the pusher block and associated grate section of each succession of alined grate sections and pusher blocks being arranged with an outlet end portion of one grate section overlapping the next succeeding pusher block and an inlet end portion of the associated grate section, the length of each pusher block being substantially less than the length of the associated grate section; and
   an adjustable speed, reversible drive means for successively moving each of said pusher blocks over a portion of the upper support surface at the inlet end of an associated grate section in a forward stroke toward the outlet end a distance substantially less than the full travel distance of the material along the upper support surface of each grate section for imparting a moving force applied through said material and retracting the pusher block in the opposite direction in a return stroke after each forward stroke during which an upper support surface portion left void is filled by incoming combustible material causing a selectivity of particle movement whereby less dense particles travel faster than more dense particles between the inlet end and outlet end of each grate section during the combustion of said particles, there being an adjustable escapement coupling means between each of said pusher blocks and the associated grate section whereby a portion of the movement of each pusher block in both a forward and a return stroke is transmitted to the associated grate section for conjoint movement between each pusher block and associated grate section.

22. In apparatus as set forth in claim 21 wherein the movement of a pusher block is transmitted to the preceding above grate section.

23. In a method of incinerating a combustible material including a plurality of adjacent reciprocally movable grate sections for supporting a combustible material during combustion, said grate sections being inclined downwardly in the direction of material advancement from an inlet end to an outlet end for each of said grate sections, a reciprocally movable pushing member at the inlet end of each of said grate sections, and means for feeding incoming material to the inlet end of said pushing members and grate sections, the steps of:
   moving said grate sections alternately back and forth in relation to the direction of material advancement from the inlet end to the outlet end of each of said grate sections;

successively moving each of said pushing members forwardly over the downwardly inclined upper surface of each of said grate sections a distance substantially less than the full length of each upper surface of each grate section between an inlet end and an outlet end to advance the material along each grate section by forces imparted through the material on each grate section in a forward stroke and moving backward in a back stroke after each forward stroke leaving a void in the material on each grate section; and filling said void after each back stroke with incoming material that is advanced by the next forward stroke of each pushing member which in turn advances the previously advanced material further along the upper surface of the associated grate section by forces imparted through the material on each grate section to cause a selectivity of particle movement whereby the less dense particles travel faster than more dense particles during combustion.

24. In a method as set forth in claim 23 including the step of continuously feeding a quantity of combustible material to the inlet ends of a first group of said grate sections.

25. In a method as set forth in claim 23 including the step of controlling the speed of the pushing motion to control the combustion along said upper support surfaces.

26. In a method as set forth in claim 23 including the step of controlling the phase relationship of adjacent upper support surfaces to break up clinker formations.

27. In a method as set forth in claim 23 including the provision of a selected number of length segments of said grate sections in alinement and decreasing the speed of each length segment to control the combustion and bed on said upper support surfaces.

28. In a method as set forth in claim 23 including the step of adjusting the distance of the pushing stroke relative to the length of travel along an associated grate section to regulate the combustion of materials on said upper support surfaces.

* * * * *